United States Patent
Maeder et al.

(10) Patent No.: US 9,883,455 B2
(45) Date of Patent: Jan. 30, 2018

(54) METHOD FOR SWITCHING A BASE STATION FROM AN INACTIVE OPERATIONAL MODE TO AN ACTIVE OPERATIONAL MODE IN A HIERARCHICALLY STRUCTURED MOBILE

(75) Inventors: Andreas Maeder, Wuerzburg (DE); Linghang Fan, Surrey (GB)

(73) Assignee: NEC CORPORATION, Tokyo (JP)

( * ) Notice: Subject to any disclaimer, the term of this patent is extended or adjusted under 35 U.S.C. 154(b) by 304 days.

(21) Appl. No.: 13/882,315

(22) PCT Filed: Oct. 27, 2011

(86) PCT No.: PCT/EP2011/068915
§ 371 (c)(1),
(2), (4) Date: May 31, 2013

(87) PCT Pub. No.: WO2012/055984
PCT Pub. Date: May 3, 2012

(65) Prior Publication Data
US 2013/0235778 A1    Sep. 12, 2013

(30) Foreign Application Priority Data

Oct. 28, 2010   (EP) ..................................... 10014075
Oct. 28, 2010   (EP) ..................................... 10014076

(51) Int. Cl.
*H04Q 7/20*    (2006.01)
*H04W 72/00*    (2009.01)
(Continued)

(52) U.S. Cl.
CPC ...... *H04W 52/0206* (2013.01); *H04W 84/045* (2013.01); *Y02B 60/50* (2013.01)

(58) Field of Classification Search
CPC . H04W 52/02; H04W 48/12; H04W 52/0206; H04W 84/045; H04W 72/00;
(Continued)

(56) References Cited

U.S. PATENT DOCUMENTS 6,430,168 B1 *   8/2002   Djurkovic ............. H04W 36/04
                                                           370/331
8,565,824 B2    10/2013   Maeder et al.
(Continued)

FOREIGN PATENT DOCUMENTS

JP       09205679       8/1997
JP       2009542147     11/2009
(Continued)

OTHER PUBLICATIONS

Mitsubishi Electric: "Dynamic Setup of HNBs for Energy Savings and Interference Reduction", 3GPP Draft; R3-081949 (Dynamic Setup HNBs), 3rd Generation Partnership Project (3GPP), Mobile Competence Centre; 650, Route Des Lucioles ; F-06921 Sophia-Antipolis Cedex ; France, vol. RAN WG3. No. Jeju Island; Aug. 13, 2008, Aug. 13, 2008 (Aug. 13, 2008). XP050165010, [retrieved on Aug. 13, 2008] chapter 2.1.
(Continued)

*Primary Examiner* — Steven H Nguyen
*Assistant Examiner* — Vanneilian Lalchinthang
(74) *Attorney, Agent, or Firm* — Young & Thompson

(57) ABSTRACT

A method and system for switching a base station from an inactive operational mode to a more active operational mode in a hierarchically structured mobile communication network preferably a WiMAX or LTE network, with at least one small cell base station and at least one macro cell base station in a radio access network includes:
a) determining a current operational mode of the at least one small cell base station;
(Continued)

b) switching the small cell base station from an inactive operational mode to a more active operational mode depending on the determined current operational mode;
c) checking whether at least one predefined criteria in addition to a parameter indicating the current operational mode of the small cell base station is fulfilled; and
d) depending on the checking result of step c) transmitting a switching signal from a higher level network entity to the small cell base station.

18 Claims, 3 Drawing Sheets

(51) Int. Cl.
*H04W 52/02* (2009.01)
*H04W 84/04* (2009.01)

(58) Field of Classification Search
CPC .......... Y02B 60/50; H04Q 7/20; H04L 67/24; H04L 12/24; H04L 12/66
USPC ........................................................ 370/311
See application file for complete search history.

(56) References Cited

U.S. PATENT DOCUMENTS

| | | | |
|---|---|---|---|
| 8,774,865 B2 | 7/2014 | Maeder et al. | |
| 8,818,391 B2 | 8/2014 | Kwon et al. | |
| 2006/0126554 A1* | 6/2006 | Motegi | H04W 76/048 370/328 |
| 2007/0097939 A1* | 5/2007 | Nylander | H04L 61/1511 370/338 |
| 2007/0238448 A1* | 10/2007 | Gallagher | H04W 4/22 455/414.2 |
| 2008/0049641 A1* | 2/2008 | Edwards et al. | 370/253 |
| 2008/0049787 A1* | 2/2008 | McNaughton | H04L 12/66 370/468 |
| 2009/0067417 A1* | 3/2009 | Kalavade | H04L 12/66 370/356 |
| 2010/0022256 A1 | 1/2010 | Hochedez | |
| 2010/0056184 A1* | 3/2010 | Vakil | H04W 4/02 455/456.5 |
| 2010/0113049 A1* | 5/2010 | Lee | H04W 48/12 455/450 |
| 2011/0098041 A1 | 4/2011 | Tomita et al. | |
| 2011/0105129 A1* | 5/2011 | Kim | H04W 36/0083 455/443 |
| 2011/0212731 A1* | 9/2011 | Lee | H04W 28/26 455/450 |
| 2012/0108238 A1* | 5/2012 | Kim | H04W 48/08 455/435.1 |

FOREIGN PATENT DOCUMENTS

| | | |
|---|---|---|
| JP | 2010010919 | 1/2010 |
| JP | 2012520600 | 9/2012 |
| JP | 2012523190 | 9/2012 |
| WO | 2010004639 | 1/2010 |
| WO | 2010/049119 A1 | 5/2010 |
| WO | 2010104295 | 9/2010 |
| WO | 2010/124865 A2 | 11/2010 |

OTHER PUBLICATIONS

"Issues with femtocell low-duty operation mode; C80216m-09 0813", IEEE Draft; C80216M-09 0813. IEEE-SA, Piscataway. NJ USA, vol. 802.16m. Apr. 24, 2009 (Apr. 24, 2009), pp. 1-4. XP017611850, [retrieved on Apr. 24, 2009], p. 3. lines 9-13.
"Interference Mitigation in Femto ABS (15.4.11) ; C80216m-09_1841r2", IEEE Draft; C80216M-09_1841R2. IEEE-SA, Piscataway. NJ USA, vol. 802.16m, Aug. 29, 2009 (Aug. 29, 2009), pp. 1-4, XP017612964, [retrieved on Sep. 23, 2009] chapter 15.4. 11.
International Search Report, dated Feb. 4, 2013, from corresponding PCT application.
Japanese Office Action, dated Jan. 7, 2015, in corresponding Japanese Patent Application No. 2013-535446.

* cited by examiner

METHOD FOR SWITCHING A BASE STATION FROM AN INACTIVE OPERATIONAL MODE TO AN ACTIVE OPERATIONAL MODE IN A HIERARCHICALLY STRUCTURED MOBILE The present invention relates to a method for switching a base station from an inactive operational mode to a more active operational mode in a hierarchically structured mobile communication network, preferably a WiMAX or LTE network, with at least one small cell base station, and at least one macro cell base station in a radio access network comprising the steps of a) determining a current operational mode of the at least one small cell base station, b) switching the at least one small cell base station from an inactive operational mode to a more active operational mode depending on the determined current operational mode.

The invention relates also to a system for switching a base station from an inactive operational mode to a more active operational mode in a hierarchically structured mobile communication network, preferably a WiMAX or LTE network and preferably for performing a method according to one of the claims 1-13, comprising at least one small cell base station, at least one macro cell base station and a radio access network connected to the macro cell base station.

BACKGROUND OF THE INVENTION

Hierarchically structured mobile communication networks are inter alia used for voice communication and recently more and more for data communication, for example between two mobile stations or between a mobile station and the internet, for receiving and sending of E-mails or the like. A hierarchically structured mobile communication network may include one or more base stations that provide services to a certain coverage area. Due to the hierarchically structure of the mobile communication network a macro cell base station covers a plurality of small cell base stations within the macro cell base station coverage area. A small cell base station within the macro cell base station coverage area may be connected to a mobile communication core network or the macro cell base station for providing services. The base stations are part of a more complex radio access network with a plurality of differently located macro cell base stations and small cell base stations preferably with at least partially overlapping coverage areas to provide uninterruptable services when changing the coverage area. Macro cell base stations and small cell base stations may be directly connected to each other and also have a connection to the mobile communication core network providing further services. Small cell base stations have in general smaller coverage areas than macro cell base stations and may even be installed by customers of an operator providing services.

In order to save energy the current draft standard of IEEE 802.16m according to IEEE, "IEEE P802.16m/D8, Part 16: Air Interface for Broadband Wireless Access Systems, Advanced Air Interface" of August 2010 supports a so called low-duty-mode (M. Einhaus, L. Fan, T. Ikeda, A. Maeder, J. Zhou, Y. Zhou "Method for operating a WiMAX femtocell base station and femtocell base station", PCT/EP 2009/007670) for reduced energy consumption and for reduction of interferences between different small cell base stations and/or macro cell base stations. In the low-duty-mode the base station preferably avoids air interface transmissions including in particular a transmission of frame preambles, pilots and broadcast channels if there is no operational need, for example if there is no mobile station within the coverage area of the base station.

However, if a mobile station enters the coverage area of a small cell base station which is currently in the low-duty-mode an air interface of the small cell base station is offline although the low-duty-mode allows a basic default transmission pattern to provide at least visibility via the air interface to mobile stations scanning for small cell base station reference signals, in particular for frame preambles of radio frames. This only provides a very slow connectivity between the mobile station and the small cell base station in the low-duty-mode, since the reference signals are broadcasted in relatively long time intervals, so that the mobile station needs time to identify the reference signal of the small cell base station and then to transmit a corresponding signal to activate the small cell base station. After the wake-up or activation of the base station the connection has to be established between the mobile station and the small cell base station in an active operational mode. This is a very time consuming procedure.

In addition to the above mentioned low-duty-mode, in PCT/EP2010/002636 a radio interface listen mode and a radio interface off mode is defined, so wake-up conditions of the small cell base station and corresponding procedures may vary according to the current suboperational mode of the base station. For example a small cell base station in the radio interface off mode cannot be activated according to the same procedure as a small cell base station in the low-duty-mode. Another problem is that a switching from an inactive operational mode to a more active operational mode of the base station may not be required, if only a transmission of a low traffic volume is requested or if a hand-over to a small cell base station may decrease a quality of service of the active connection between the mobile station and the base station, so that a direct connection between the mobile station and a small cell base station is not required or may not be beneficial and a connection between a macro cell base station and a mobile station may be sufficient in these cases.

SUMMARY OF THE INVENTION

It is therefore an objective of the present invention to provide a method and a system for switching a base station from an inactive operational mode to a more active operational mode avoiding unnecessary activation of a base station in an inactive operational mode.

It is a further objective of the present invention to provide a method and a system for switching a base station from an inactive operational mode to a more active operational mode with a faster connection establishment between the mobile station and the base station.

It is a further objective of the present invention to provide a method and a system for switching the base station from an inactive operational mode to a more active operational mode with a fast and reliable switching between different inactive and/or an active operational mode.

In accordance with the invention the aforementioned objectives are accomplished by a method of claim 1 and a system of claim 14.

According to claim 1 a method for switching a base station from an inactive operational mode to a more active operational mode in a hierarchically structured mobile communication network, preferably a WiMAX or LTE network, with at least one small cell base station and at least one macro cell base station in a radio access network comprising the steps of a) determining a current operational mode of the at least one small cell base station, b) switching the at least one small cell base station from an inactive operational mode to a more active operational mode depending on the determined current operational mode is characterized by the steps of c) checking whether at least one predefined criteria in addition to a parameter indicating the current operational mode of the at least one small cell base station is fulfilled and d) depending on the checking result of step c) transmitting a switching signal from a higher level network entity, preferably the at least one macro cell base station, to the at least one small cell base station.

According to claim 14 a system for switching a base station from an inactive operational mode to a more active operational mode in a hierarchically structured mobile communication network, preferably a WiMAX or LTE network and preferably for performing a method according to one of the claims 1-13, comprising at least one small cell base station and at least one macro cell base station in a radio access network, is characterized in that the at least one small cell base station is formed such to switch from an inactive operational mode to a more active operational mode depending on the determined current operational mode, when a checking is performed whether at least one predefined criteria in addition to a parameter indicating the current operational mode of the at least one small cell base station is fulfilled and depending on the checking result a higher level network entity, preferably the at least one macro cell base station, is formed such to transmit a switching signal to the at least one small cell base station.

Of course the method and the system is not limited to small cell base stations but also to base stations in general having at least one inactive and one more active operational mode.

According to the invention it is first been recognized that transmitting a switching signal from a higher level network entity, for instance a mobility management entity, preferably located in the mobile communication core network, or a macro call base station, to the at least one small cell base station based on the predefined criteria and based on a current operational mode of the at least one small cell base station provides a flexible and reliable switching or "wake-up" from an inactive to an active or more active operational mode of the small cell base station.

According to the invention it has further been first recognized that a wake-up of a base station, in particular the at least one small cell base station having different inactive operational modes may be easily performed since a predefined criteria and/or a current operational mode allows different criteria for different operational modes taking into account the different characteristics of the different inactive operational modes.

According to the invention it has also been first recognized that a faster connection establishment compared to conventional methods or systems is provided due to an adaption of the switching depending on the inactive operational mode of the preferably small cell, base station.

According to the invention it has further been recognized that the method and the system reduce the energy consumption and interference in mobile communication networks since a wake-up of small cell base stations, meaning preferably the switching from an inactive operational mode to a more active operational mode, is based on predefined criteria including the current operational mode and further criteria for example the type of a requested service. This enables a switching only to a more active operational mode if necessary. This further provides an increase of a quality of service for certain network traffic types like voice data traffic or the like between the at least one small cell base station and the at least one macro cell base station and/or a further with the radio access network and further network connected to the radio access network like a core network.

Further features, advantages and preferred embodiments are described in the following subclaims.

According to a preferred embodiment the inactive operational mode comprises at least two, preferably three, hierarchically structured inactive suboperational modes. This provides a flexible adaption of small cell base stations regarding energy consumption. For example if there is no mobile station to be found within a certain time interval and within the coverage area of the small cell base station the small cell base station may switch from an active operational mode to a first inactive operational mode for example by turning off the air interface of the small cell base station. After a second time interval the base station may also reduce the activity on the interface for a wireless connection between the small cell base station and the macro cell base station. Therefore a plurality of hierarchically structured inactive operational modes allows a flexible scheme for energy saving. Such inactive operational mode may include a low-duty mode, a radio interface listen mode and a radio interface off mode according to A. Maeder, L. Fan, M. Einhaus "Method for operating a base station and a base station".

According to a further preferred embodiment a mobile station connects to at least one of the macro cell base stations and at least the steps c) and d) are performed with the predefined criteria in addition to a parameter indicating a threshold value for a distance between the mobile station and the at least one small cell base station. This provides a further energy reduction of the at least one small cell base station: if the mobile station is connected to a macro cell base station and if the macro cell base station is aware of the current operational mode of the at least one small cell base station the macro cell base station may transmit a switching signal to the at least one small cell base station for switching into a more active operational mode of the small cell base station if the small cell base station is in an inactive operational mode and if the mobile station is within a connection distance of the at least small cell base station and if a predefined criteria for example high priority high volume data traffic is requested by the mobile station. After receiving the switching signal by the at least one small cell base station the at least one small cell base station switches to the more active operational mode and the mobile station recognizes now the at least one small cell base station and connects to the small cell base station for transferring a high priority high volume data.

According to a further preferred embodiment the switching signal is included in a paging signal for establishing data traffic between the at least one macro cell base station and a mobile station assigned to the at least one small cell base station. Data traffic means all sorts of data to be transmitted from a mobile station to a base station including pure data traffic, voice traffic, short message services, multimedia message services or the like. When the switching signal is included or embedded in a paging signal the switching signal may easily be provided in preferably standardized paging protocols. For example, the switching signal may be embedded in the Paging_Announce message of the WiMAX forum. A further advantage is, that by including the switching signal in the paging signal a selective activation of small cell base stations is possible. For example paging signals in form of paging messages may selectively sent by a core network to the radio access network comprising the macro cell and small cell base stations based on a type, a requested service and a mode of the small cell base stations. If, for example, the small cell base station is in a low-duty-mode the small cell base station does not change its current operational mode according to a paging signal when the paging signal is provided such that it is intended for a macro cell base station for macro cell paging.

According to a further preferred embodiment the paging signal is sent to the at least one macro cell base station and/or subsidiary to a small cell base station in an active operational mode and/or subsidiary to a small cell base station in an inactive operational mode. This provides a paging in a step-by-step manner. In a first step macro cell base stations are paged, then small cell base stations in an active operational mode and finally small cell base stations in an inactive operational mode. It is further possible that paging can be further differentiated for the different inactive operational modes of the at least one small cell base station. In summary one of the advantages is that only small cell base stations which fulfill a predefined criteria are switched from an inactive operational mode to an active operational mode and only if the small cell base station in an inactive operational mode is a target of the paging signal by embedding a corresponding switching signal.

According to a further preferred embodiment the paging signal includes a paging message with at least one base station identity information element, preferably including information about a hierarchical level of the at least one macro cell base station and/or the at least small cell base station and/or the current operational mode of the at least one macro cell base station and/or the at least one small cell base station. By including a paging message in the paging signal with a base station identity information element, a standardized paging message can be easily adapted without a complete restructuring of the paging message and the paging procedure.

According to a further preferred embodiment a mobile station performs a scanning of a current operational mode of at least one of the small cell base stations of at least one macro cell base station and sends a scanning result to the macro cell base station assigned to the mobile station. An advantage is, that this allows a fast switching of an inactive operational mode of a small cell base station to a more active operational mode of the small cell base station. Preferably the scanning result may include the type and the current operational mode of a scanned small cell base station, resulting in an even faster switching from an inactive operational mode to a more active operational mode of the small cell base station.

According to a further preferred embodiment the radio access network is connected to a database, wherein the database includes base station assigning information and/or current operational mode information of at least one of the small cell base stations. A database provides in a centralized manner a list of current operational modes of the small cell base stations. A mobile station may, for example, update a current operational mode of a small cell base station scanned by the mobile station by transmitting a scanning result of the scanned small cell base station. Further a macro cell base station may also access the database, so that a mobile station connected to a macro cell base station, for example when transferring low priority and/or low amount of data, may switch a small cell base station to a more active operational mode when the mobile station connected to the macro cell base station is within the coverage area of the small cell base station so that the small cell base station may connect to the mobile station if a high volume of data traffic and/or with a high priority is sent by the mobile station. Further a core network may be connected to the radio access network and may provide mobility management functions by a mobility management function entity which may also have access to the current operational modes of the small cell base stations via the database so that a reliable and flexible switching from inactive operational modes to a more active operational mode of a small cell base station is provided.

According to a further preferred embodiment the scanning result is included in the scanning report according to IEEE 802.16m, preferably in the AAI-SCN-REP message. Thus, a standardized message may be used by adding scanning results so that base stations may or may not use the additional information in the scanning report according to IEEE 802.16m, if for example a base station are not upgraded to the latest version of a corresponding protocol of a scanning report or if a base station is not formed such to exploit the additional information in the scanning report therefore providing downward compatibility for base stations with former versions of the corresponding protocol.

According to a further preferred embodiment the AAI-SCN-REP message includes an additional information element for indicating scanning of small cell base stations in an inactive operational mode, preferably with size of one bit. The size of one bit minimizes the amount of data to be transferred in the AAI-SCN-REP message needed for indicating a scanning of small cell base stations by a mobile station. When the AAI-SCN-REP message is received by the mobile station the mobile station extracts the additional information element. If the additional information element indicates a scanning the mobile station scans for small cell base stations within its coverage area and determines during the scanning process the current operational mode of a small cell base station.

According to a further preferred embodiment the at least one macro cell base station uses an over-the-air-interface for transmitting the switching signal to the at least one small cell base station in an inactive operational mode. This provides a flexible way to transmit the switching signal from the at least one macro cell base station to the at least one small cell base station; cable based or wire line connections between a macro cell base station and a small cell base station have not to be applied.

According to a further preferred embodiment the at least one predefined criteria includes network performance information parameters and/or base station type parameters. This provides a plurality of options defining small cell base stations to be switched from an inactive operational mode to more active operational mode according to an actual performance of the radio access network a core network or relevant network parts.

According to a further preferred embodiment the network performance information parameters include energy consumption parameters, quality-of-service related parameters, preferably maximum and/or average packet latency and/or guaranteed minimum data rate and/or application type parameters, preferably indicating voice-over-IP, short-message-service, machine-to-machine data and/or timing related parameters like timing information for a regularly scheduled data. This further enhances flexibility and options to configure the switching of small cell base stations from an inactive operational mode to a more active operational mode.

There are several ways how to design and further develop the teaching of the present invention in an advantageous way. To this end it is to be referred to the patent claims subordinate to patent claims 1 and 14 on the one hand and to the following explanation of preferred embodiments of the invention by way of example, illustrated by the drawing on the other hand. In connection with the explanation of the preferred embodiments of the invention by the aid of the drawing, generally preferred embodiments and further developments of the teaching will be explained.

BRIEF DESCRIPTION OF THE DRAWINGS

In the drawing

FIG. 1 shows a schematically view of a system according to an embodiment of the present invention.

DETAILED DESCRIPTION OF THE PREFERRED EMBODIMENTS

Figure 1:
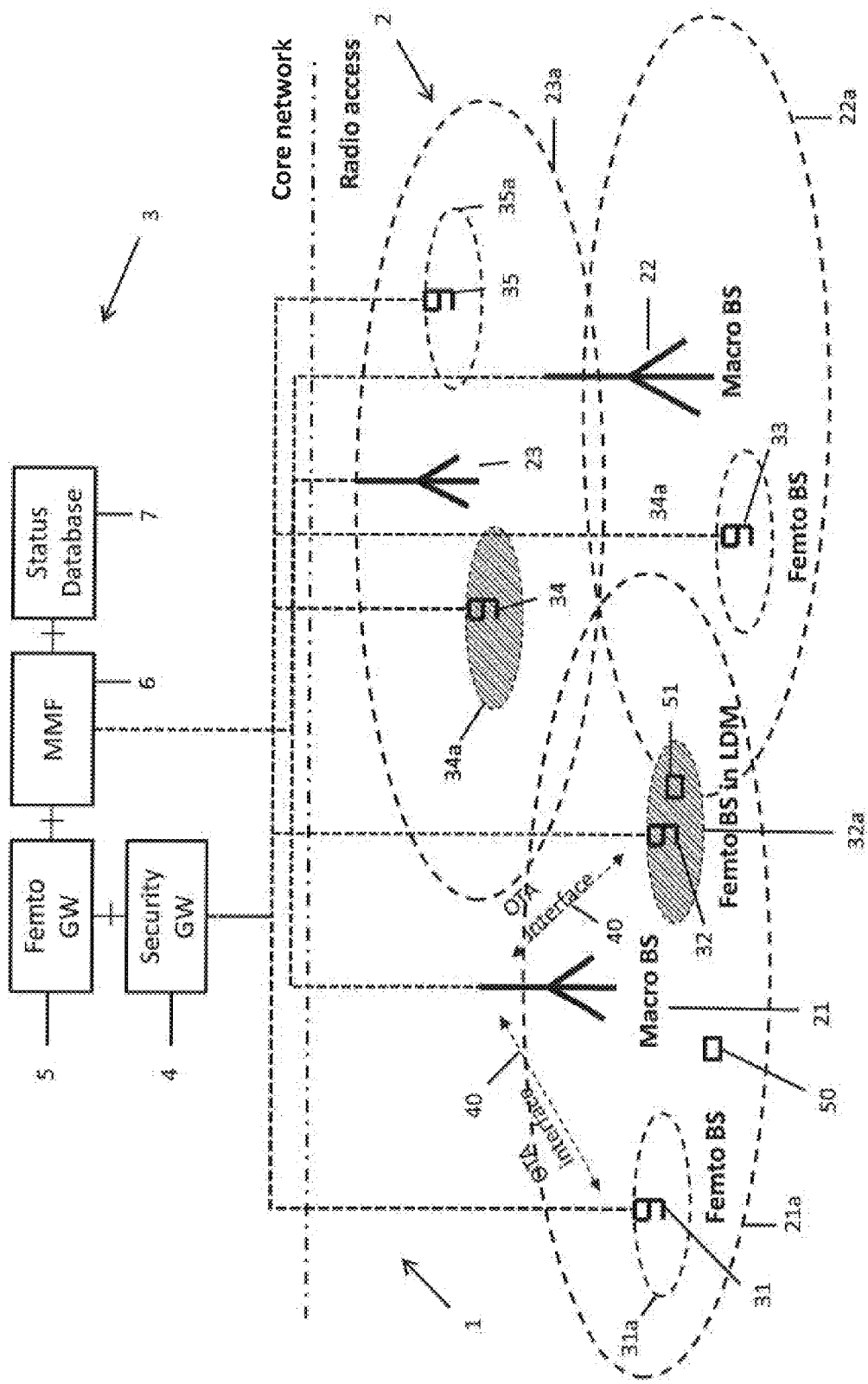
FIG. 1 shows a schematical view of a system according to an embodiment of the present invention.

FIG. 1 shows a system 1 comprising a radio access network 2 and a core network 3. The core network 3 comprises a security gateway 4 connected to a small cell gateway in form of a femtocell gateway 5. The femtocell gateway 5 is connected to a mobile management function entity 6 and the mobile management function entity 6 is connected to a status data base 7 for storing current operational status of small cell base stations in form of femtocell base stations. The radio access network 2 comprises a plurality of macro cell base stations 21, 22, 23 each having a certain coverage area 21a, 22a, 23a. Within the coverage area 21a of macro cell base station 21 two femtocell base stations 31, 32 are located each having a corresponding femtocell coverage area 31a, 32a. Each femtocell base station 31, 32 comprises an over-the-air-interface for a communication with a corresponding over-the-air-interface of the macro cell base station 21 for an over-the-air-transmission 40.

In the macro cell base station coverage area 22a a femtocell base station 33 having a femtocell coverage area 33a is located. Further, in the macro cell base station coverage area 23 two femtocell base stations 34, 35 each having a femtocell coverage area 34a, 35a are located. The macro cell base stations 21, 22, 23 are connected to the mobility management function entity 6. The femtocell base stations 31, 32, 33, 34, 35 are connected to the security gateway 4.

A mobile station 50 within the coverage area 21a of the macro cell base station 21 and a mobile station 51 within the femtocell coverage area 32a of the femtocell base station 32 and within the coverage area 21a of the macro cell base station 21 are also shown in FIG. 1.

If the mobile station 50 tries to transmit for example short-message-service (SMS) data the mobile station 50 does not have access to the femtocell base stations 31, 32 but only to the macro cell base station 21. Therefore, the mobile station 50 connects to the macro cell base station 21 to transmit the short-message-service data.

In contrast thereto the mobile station 51 is within the femtocell coverage area 32a of the femtocell base station 32. The femtocell base station 32 however is in a low-duty-mode. In order to provide a communication between the mobile station 51 and the femtocell base station 32 the femtocell base station 32 in the low-duty-mode has to switch to a normal active operational mode since in the low-duty mode according to IEEE 802.16m the air interface of the femtocell base station 32 is reduced, e.g. is switched off on some radio frames.

In order to "wake-up" the femtocell station 32 the mobile station 51 connects to the macro cell base station 21 when the mobile station 51 is within the corresponding macro cell coverage area 21a. When the mobile station 51 enters the femtocell coverage area 32a the macro cell base station 21 connects to the status database 7 via the mobility management function entity 6 for requesting the current operational mode of the femtocell base station 32. The mobility management function entity 6 provides the current operational mode of the femtocell base station 32 to the macro cell base station 21 which is a low-duty-mode. The macro cell base station 21 then transmits a switching signal to the femtocell base station 32. The femtocell base station 32 is then switched from a low-duty-mode to an active operational mode according to the switching signal. The mobile station 51 recognizes that the femtocell base station 32 is now in an active or normal operational mode and connects to the femtocell base station 32 for data transmission. Since the femtocell base station 32 is also directly connected to the mobility management function entity 6 a decision to "wake up" of the femtocell base station 32 may also be performed directly by the mobility management function entity 6.

If the mobile station 51 would like to send low priority and/or low volume data like short-message-service (SMS) data the mobile station 51 sends the SMS data directly to the macro cell base station 21. The macro cell base station 21 receiving the corresponding transmission request from the mobile station 51 requests the current operational mode of the femtocell base station 32 from the mobility management function entity 6 connected to the status database 7. The macro cell base station 21 may also provide a mobility management function entity 6 the service requested by the mobile station 51, i.e. a transmission of short-message-service data. The mobility management function entity 6 then determines that a "wake-up" of the femtocell base station 32 is not necessary since the low amount of SMS data may be handled by the macro cell base station 21 directly. The mobility management function entity 6 therefore does not provide any switching signal to the femtocell base station 32 in low-duty mode or provide a corresponding information to the macro cell base station 21 to avoid an unnecessary "wake-up" of the femtocell base station 32. In this case the mobility management function entity 6 would first page the mobile station 51 only with the macro cell base station 21. Similarly voice traffic of the mobile station 51 may also be efficiently handled by the macro cell base station 21 directly due to the low traffic volume and strict requirements on latency, especially during handover. That means that the macro cell base station 21 would not "wake-up" the femtocell base station 32 in its coverage area 21a even if it would be possible.

In general the type of service or requested traffic like the already mentioned short-message-service, may include quality of service related parameters like maximum/average packet latency, guaranteed minimum data rate, etc., application types such as voice-over-IP, short-message-service, machine-to-machine data, etc. and/or timing-related information for a regularly scheduled data.

Figure 2:
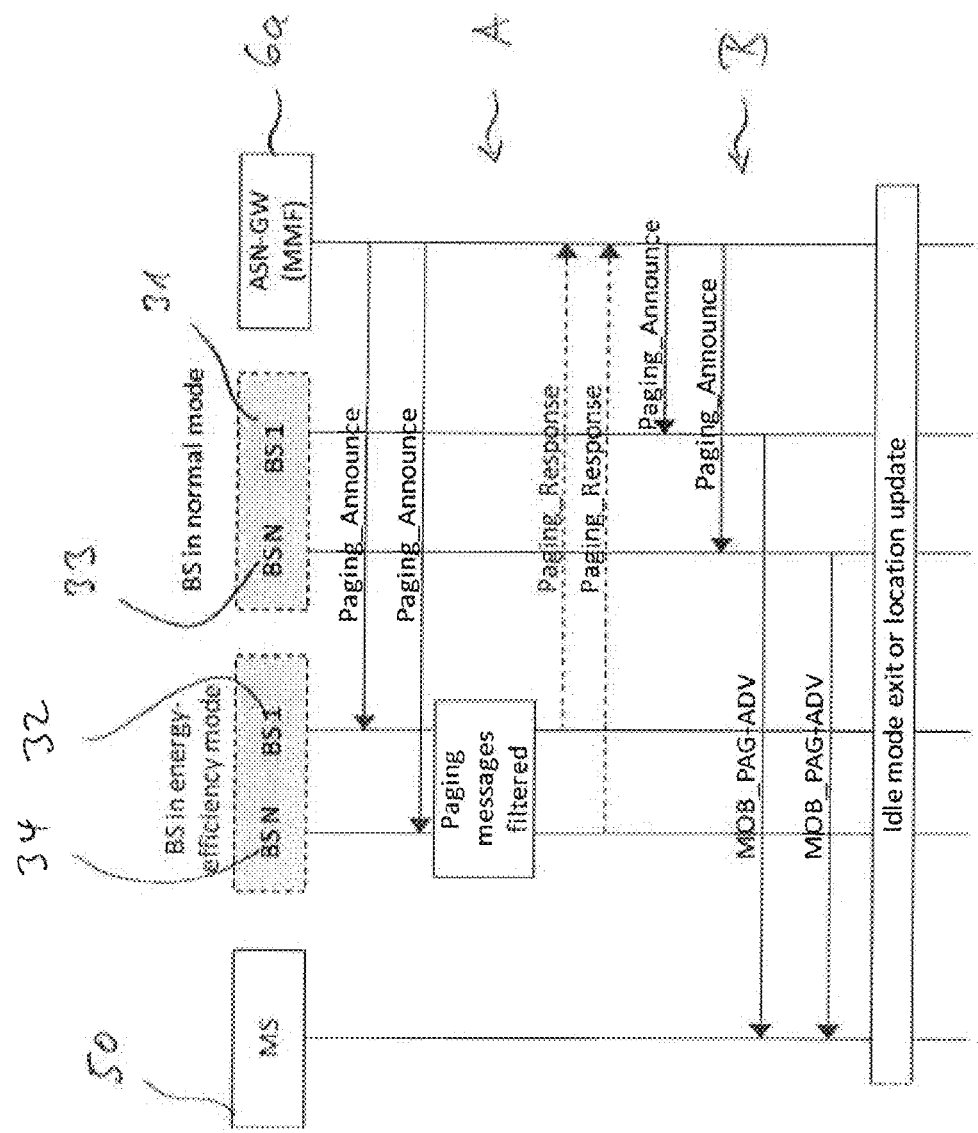
FIG. 2 shows a method according to a second embodiment of the present invention.

FIG. 2 shows a method according to a second embodiment of the present invention.

In order to set up communication channels for, for example a one to one communication between a mobile station 50 and a macro cell base station or a small cell base station in form of a femtocell base station 31, 32, 33, 34, paging is required. In order to avoid that the base station 31, 32, 33, 34 in an inactive operational mode is switched to an active or normal operational mode when it is not necessary a selective paging is required. One option to provide such a selective paging is to send paging messages selectively based on a type, a requested service and a current operational mode of the small cell base station. Another option to provide such a selective paging is to include an information element in the paging message which is then filtered at the different types of base stations 31, 32, 33, 34. A further option is that a paging may be done in a step-by-step manner, where for example first macro cell base stations 21, 22, 23 are paged then femtocell base stations 31, 33, 35 in a normal operational mode and finally femtocell base stations 32, 34 in an inactive operational mode. This can be further divided into different inactive operational modes.

In FIG. 2 there is shown a modified paging message flow in a WiMAX network. An access service network gateway 6a serving as a mobility management function entity 6 pages base stations 31, 33 in a normal operational mode and base stations 32, 34 in an inactive operational mode, for example in an energy-efficiency mode. To perform paging a so called Paging_Announce message is provided including information for the access service network gateway 6a and the base stations 31, 32, 33, 34 to perform paging. For paging the access service network gateway 6a sends the Paging_Announce messages to the base stations 32, 34 in energy efficiency mode so that the base stations 32, 34 in energy efficiency mode are waking up, i.e. switching to a normal operational mode. If the access service network gateway 6a is aware of the current operational modes of the base stations 32, 34 in energy efficient mode the access service network gateway 6a may use a base station identification information element to send a paging message for one or more base stations 32, 34 complying with the base station identification information element and the current operational mode of the base station 32, 34. If such an information element is not available the decision for switching to a normal operational mode may be done by a corresponding device in a base station 32, 34 itself.

If the access service network gateway 6a uses flood paging an additional information element must be included in the Paging_Announce message. Flood paging means that the access service gateway 6a sends the Paging_Announce message to all base stations within a specified tracking or coverage area. In FIG. 2 the access service network gateway 6a sends Paging_Announce messages to all base stations 32, 34 in energy efficiency mode. However, in the Paging_Announce message an information element concerning the base station type and the operational mode of the base stations 32, 34 is included. All paged base stations 32, 34 in energy efficient mode filter the Paging_Announce message and switch to a normal operational mode if the information element comprising type and operational mode correspond to the type and operational mode of base stations 32, 34. Optionally, the base stations 32, 34 may respond with a Paging_Response message to the access service network gateway 6a to indicate the access service network gateway 6a that the paging request sent by the access service network gateway 6a could not be performed due to a local filtering, meaning that the Paging_Announce message does not comply with predefined or actual base station characteristics for example type and operational mode of the corresponding base stations 32, 34.

If only one access service network gateway 6a is involved in the paging procedure, the access service network gateway 6a sends a reference point R6 Paging_Announce message to the relevant base stations 32, 34. If more than one access service network gateway is involved in the paging procedure both reference points R4 and R6 Paging_Announce messages are sent to the relevant base stations 32, 34, wherein reference point R4 Paging_Announce messages are sent between the different access service network gateways 6a and the reference point R6 Paging_Announce messages are sent between the corresponding access service network gateways 6a and the base stations 32, 34.

In case that a macro cell base station needs to "wake-up" a small cell base station 32, 34 in an energy-efficient mode within its coverage area a Paging_Announce message may be send over reference point R8 which is intra access service network.

The above mentioned reference points R4, R6 and R8 are defined as follows:

Reference point R4 consists of the set of control and data path protocols originating/terminating in an access service network gateway that coordinate mobile stations mobility between access service networks and access service network gateways. R4 is the only interoperable reference point between the access service network gateways of one access service network or two different access service networks.

Reference point R6 consists of the set of control and data path protocols for communication between a base station and the access service network gateway within a single access service network. The data path consists of intra-access service network data paths between the base station and access service network gateway. The control protocols comprise functions for data path establishment, modification, and release control in accordance with the mobile stations mobility events. However, when protocols and primitives over reference point R8 are available, MAC states will not be exchanged over reference point R6.

Reference point R8 is intra-access service network and consists of the set of control message flows between the base stations to ensure fast and seamless handover. The control plane consists of the inter-base station communication protocol in line with the WiMAX Forum Mobile System Profile and additional set of protocols that allow controlling the data transfer between the base stations involved in handover of a certain mobile stations.

In a Paging_Announce message of WiMAX forum the Paging_Announce message may be modified as follows:

| IE | Reference | M/O | Notes |
|---|---|---|---|
| ... | | | |
| >Target BS Type (new) | | O | If flood paging is used, this field indicates whether the message is intended for macrocells or femtocells. 1 = macrocell BSs. 0 = femtocell BSs. |
| >Target Femtocell BS status (new) | | O | If femtocell BSs support energy-efficiency modes, this TLV defines the states of the addressed femtocells. |
| ... | | | |

Further a type-length-value definition of a target femtocell base station status is given below:

TLV definition of Target Femtocell BS status:

| Type | TBD |
|---|---|
| Length in octets | 1 |
| Value | 0x00 = reserved |
| | 0x01 = normal operation |
| | 0x02 = low-duty mode |
| | 0x04 = radio interface listen mode |
| | 0x08 = radio interface off mode |
| | 0x10-0x80 = reserved |
| | 0xFF = all states |
| Description | Bit mask of states which are addressed in the femtocell BS. |
| Parent TLV | None |

In section B of FIG. 2 the access service network gateway 6a sends Paging_Announce messages to base stations 31, 33 in normal mode. The corresponding base stations 31, 33 are then sending each a MOB_PAG-ADV message to a mobile station 50 for conventional paging.

Figure 3:
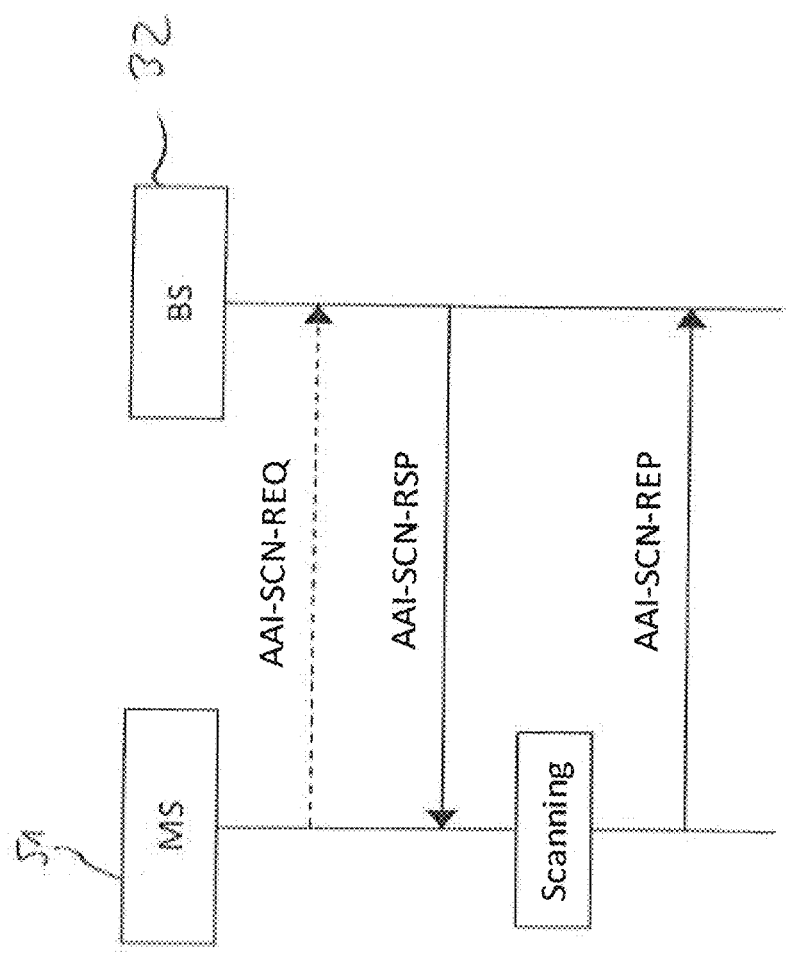
FIG. 3 shows a diagram of a part of a method according to a third embodiment of the present invention.

FIG. 3 shows a diagram of a part of a method according to a third embodiment of the present invention.

In FIG. 3 there is shown a base station 32 and a mobile station 51. The mobile station 51 sends a scanning request for a controlling corresponding base station 32 by means of a AAI-SCN-REQ request message according to IEEE 802.16m. The base station 32 sends a AAI-SCN-RSP response message according to IEEE 802.16m. The mobile station 51 then may perform a scanning for a small cell or femtocell base station in a low duty mode itself or the AAI-SCN-RSP message may include an additional entry to indicate the mobile station 51 to scan explicitly for small or femtocell base stations in an inactive operational mode, preferably in a low-duty-mode. The mobile station 51 then performs a corresponding scanning and may send the scanning result with the current operational mode of a scanned femto or small cell base station included in an AAI-SCN-REP message. The scanning result may be included in the AAI-SCN-REP message according to IEEE 802.16m as a single bit entry indicating the mode of the scanned small cell base station:

TABLE 4

AAI-SCN-REP modifications

| Field | Size (bits) | Value/Description | Condition |
|---|---|---|---|
| ... | | | |
| Neighbor_Request_Indication | 1 | Request indication for system information and the list of the neighbor Femto ABSs | Optional |
| If(Neighbor_Request_Indication == 1) { | | | |
| Neighbor_Request_BS_Type | 3 | Indicates type of neighbor Femto ABSs for which system information is requested. Bit #0: CSG-Closed Femto ABS Bit #1: CSG-Open Femto ABS Bit #2: OSG Femto ABS | Optional |
| Femto_BS_State (new) | 1 | Indicates current state of Femto BS. 0: normal mode 1: LDM | Optional |
| for (j=0; j<N_CSG_IDs; j++) { | | N_CSG_IDs is the number of CSG IDs | Optional. Sent by AMS to aid in generation of optimized neighbor list by the ABS |
| CSGID | variable | The CSGID within the Operator ID. It may be part of the BS ID, with certain bits inside indicating its length. If the CSG has single BS, it may be of maximum length which is the LSB-24 bits of the full BS ID. | |
| } | | | |
| } | | | |

The mobile station 51 may scan a small cell base station preferably in form of a femtocell base station 32, 34 even if the small cell base station 32, 34 is in an operational mode where the air interface of the small cell base station 32, 34 is reduced but not switched off. The small cell base station 32, 34 may preferably include its current operational mode and/or type of operational mode in system information data which is broadcasted by the small cell base station 32, 34, for example on the broadcast channel BCH in LTE or the secondary superframe header S-FH according to IEEE 802.16m. A further option is that the mobile station 51 is formed such that the mobile station 51 may deduce the current operational mode of the small cell or femtocell base station 32, 34 from the transmission pattern of the small cell base station 32, 34. The scanning may also be required, if the access service network gateway 6a is not connected to a status data base 7 or data in the status data base 7 is inconsistent.

In summary the present invention provides a framework for selectively waking-up small cell base stations to reduce energy consumption and interferences in a wireless network. The criteria are based on traffic types and traffic volume and on small cell base station operational modes. One of the advantages of the present invention is that signaling for faster indication of small cell base station modes is defined. A further advantage is that due to the selective signaling unnecessary activation of small cell base station in energy/efficiency modes, like the low-duty mode, is avoided. This reduces further the interference to macro cell base stations and other small cell base stations and provides a reduction in energy consumption for base stations and/or mobile stations. A further advantage is an increase in quality of service for services like voice-over-IP due to a lower latency in hand-over. A further advantage is that modifications concern mainly the radio and access network and/or the core network comprising the mobility management function entity. Alternatively a distributed message filtering system for paging messages is proposed.

Many modifications and other embodiments of the invention set in forth herein will come to mind the one skilled in the art to which the invention pertains having benefit of the teaching presented in the foregoing description and the associated drawings. Therefore it is to be understood that the invention is not to be limited to the specific embodiments disclosed and that modifications and other embodiments are intended to be included within the scope of the appended claims. Although specific terms are employed herein they are used in a generic and descriptive sense only for purposes of limitation.

The invention claimed is:

1. A method for switching a base station (32, 34) from an inactive operational mode to a more active operational mode in a hierarchically structured mobile communication network (2, 3) with at least one small cell base station (31, 32, 33, 34) and at least one macro cell base station (21, 22, 23) in a radio access network (2), the method comprising the steps of:
   a) determining a current operational mode of the at least one small cell base station (31, 32, 33, 34);
   b) switching the at least one small cell base station (31, 32, 33, 34), from an inactive operational mode to the more active operational mode depending on the determined current operational mode, by a switching signal, said switching signal being included in a paging signal for establishing data traffic between the at least one macro cell base station (21, 22, 23) and a mobile station (50, 51) assigned to the at least one small cell base station (31, 32, 33, 34), the paging signal being sent to any of i) the at least one macro cell base station (21, 22, 23), ii) a subsidiary to a small cell base station (31, 32, 33, 34) in active operational mode, and iii) the subsidiary to the small cell base station (31, 32, 33, 34) in an inactive operational mode;
   c) checking whether at least one predefined criteria in addition to a parameter indicating the current operational mode of the at least one small cell base station (31, 32, 33, 34) is fulfilled; and
   d) depending on the checking result of step c), transmitting a switching signal from a higher level network entity (6, 21, 22, 23) to the at least one small cell base station (31, 32, 33, 34),
   wherein the at least one predefined criteria includes network performance information parameters, said network performance information parameters including any of energy consumption parameters, quality of services related parameters, and timing related parameters.

2. The method according to claim 1, wherein the inactive operational mode comprises at least two hierarchically structured inactive sub operational modes.

3. The method according to claim 1, wherein a mobile station (50, 51) connects to at least one of the macro cell base stations (21, 22, 23) and that at least the steps c) and d) are performed with the predefined criteria in addition to a parameter indicating a threshold value for a distance between the mobile station and the at least one small cell base station (31, 32, 33, 34).

4. The method according to claim 1, wherein the paging signal includes a paging message with at least one base station identity information element.

5. The method according to claim 1, wherein a mobile station (50, 51) performs a scanning of a current operational mode of at least one of the small cell base stations (31, 32, 33, 34) of at least one macro cell base station (21, 22, 23) and sends a scanning result to the macro cell base station (21, 22, 23) assigned to the mobile station (50, 51).

6. The method according to claim 5, wherein the scanning result is included in the scanning report according to IEEE 802.16m.

7. The method according to claim 6, wherein the AAI-SCN-REP message includes an additional information element for indicating scanning of small cell base stations (31, 32, 33, 34) in an inactive operational mode.

8. The method according to claim 1, wherein the at least one macro cell base station (21, 22, 23) uses an over-the-air-interface for transmitting the switching signal to the at least one small cell base station (31, 32, 33, 34) in an inactive operational mode.

9. A system for switching a base station (31, 32, 33, 34) from an inactive operational mode to a more active operational mode in a hierarchically structured mobile communication network (2, 3), comprising:
   at least one small cell base station (31, 32, 33, 34); and
   at least one macro cell base station (21, 22, 23) in a radio access network (2),
   wherein the at least one small cell base station (31, 32, 33, 34) is formed such to switch, upon receiving a switching signal, wherein the switching signal is included in a paging signal for establishing data traffic between the at least one macro cell base station (21, 22, 23) and a mobile station (50, 51) assigned to the at least one small cell base station (31, 32, 33, 34), from an inactive operational mode to the more active operational mode depending on the determined current operational mode, when a checking is performed whether at least one predefined criteria in addition to a parameter indicating the current operational mode of the at least one small cell base station (31, 32, 33, 34) is fulfilled, wherein the paging signal is sent to any of i) the at least one macro cell base station (21, 22, 23), ii) a subsidiary to a small cell base station (31, 32, 33, 34) in active operational mode, and iii) the subsidiary to the small cell base station (31, 32, 33, 34) in an inactive operational mode, wherein, depending on the checking result, a higher level network entity is formed such to transmit a switching signal to the at least one small cell base station (31, 32, 33, 34), and wherein the at least one predefined criteria includes network performance information parameters, said network performance information parameters including any of energy consumption parameters, quality-of-service related parameters and timing related parameters.

10. The method according to claim 2, wherein a mobile station (50, 51) connects to at least one of the macro cell base stations (21, 22, 23) and that at least the steps c) and d) are performed with the predefined criteria in addition to a parameter indicating a threshold value for a distance between the mobile station and the at least one small cell base station (31, 32, 33, 34).

11. The method according to claim 2, wherein the switching signal is included in a paging signal for establishing data traffic between the at least one macro cell base station (21, 22, 23) and a mobile station (50, 51) assigned to the at least one small cell base station (31, 32, 33, 34).

12. The method according to claim 3, wherein the switching signal is included in a paging signal for establishing data traffic between the at least one macro cell base station (21, 22, 23) and a mobile station (50, 51) assigned to the at least one small cell base station (31, 32, 33, 34).

13. The method according to claim 2, wherein the paging signal is sent to at least one of the macro cell base station (21, 22, 23), the subsidiary to the small cell base station (31, 32, 33, 34) in active operational mode, and the subsidiary to the small cell base station (31, 32, 33, 34) in an inactive operational mode.

14. The method according to claim 4, wherein the at least one base station identity information element includes information about a hierarchical level of the at least one of the macro cell base station (21, 22, 23), the at least one small cell base station (31, 32, 33, 34), the current operational mode of the at least one macro cell base station (21, 22, 23), and the at least one small cell base station (31, 32, 33, 34).

15. The method according to claim 1, wherein the network performance information parameters further include any of maximum packet latency, average packet latency, guaranteed minimum data rate, and application type parameters.

16. The method according to claim 1, wherein the at least one predefined criteria also includes base station type parameters.

17. The method according to claim 1, wherein the at least one predefined criteria also includes base station type parameters.

18. The method according to claim 1, wherein said radio access network (2) being connected to a database (7), said database (7) including any of base station assigning information and current operational mode information of at least one of the small cell base stations (31, 32, 33, 34).

* * * * *